United States Patent [19]

Cardenas et al.

[11] 4,409,013

[45] Oct. 11, 1983

[54] 90 DEGREE PUSH-OUT FOR GLASSWARE FORMING MACHINES AND ELECTRONIC CONTROL FOR THE SAME

[75] Inventors: Luis F. Cardenas; Enrique M. Veazey, both of Monterrey, Mexico

[73] Assignee: Vitro Tec Fideicomiso, Monterrey, Mexico

[21] Appl. No.: 314,796

[22] Filed: Oct. 26, 1981

[30] Foreign Application Priority Data

Oct. 27, 1980 [MX] Mexico ................................. 184491

[51] Int. Cl.³ ............................................. C03B 9/40
[52] U.S. Cl. ...................... 65/163; 65/160; 65/241; 65/DIG. 13
[58] Field of Search ............... 65/160, 163, 227, 241, 65/323, DIG. 13

[56] References Cited

U.S. PATENT DOCUMENTS

| | | | |
|---|---|---|---|
| 4,007,028 | 2/1977 | Bublitz et al. | 65/163 |
| 4,203,752 | 5/1980 | Becker et al. | 65/163 |
| 4,313,750 | 2/1982 | Lulejian et al. | 65/160 |

Primary Examiner—Arthur D. Kellogg
Attorney, Agent, or Firm—Kemon & Estabrook

[57] ABSTRACT

Article handling apparatus for use in conjunction with a glassware forming machine is effective to remove finished ware from a dead plate where it has been placed to cool and transfer it to a moving conveyor. An electronic control synchronizes the movements of the apparatus with the cycle of the forming machine and deposits the ware on the moving conveyor with a component of velocity in the direction of the conveyor movement which effects smooth transfer to the conveyor irrespective of variations in conveyor speed.

4 Claims, 7 Drawing Figures

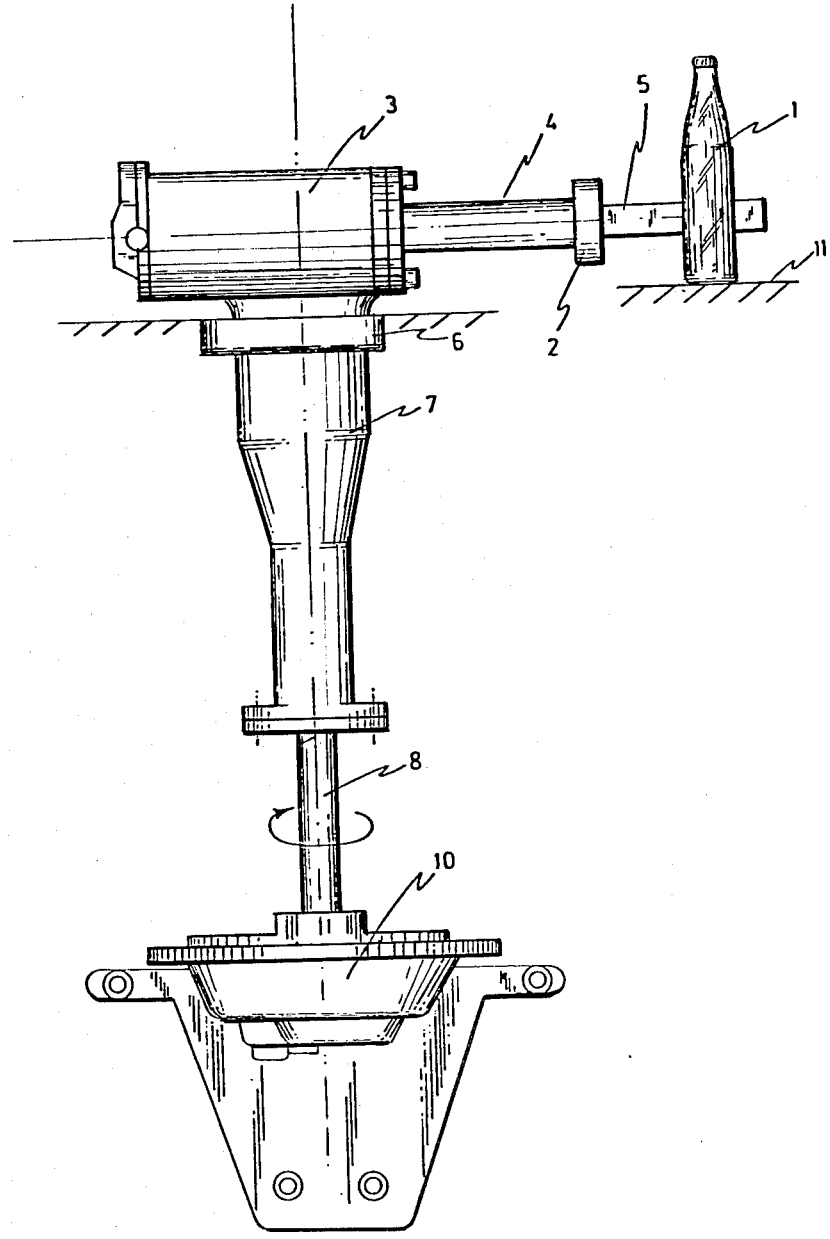

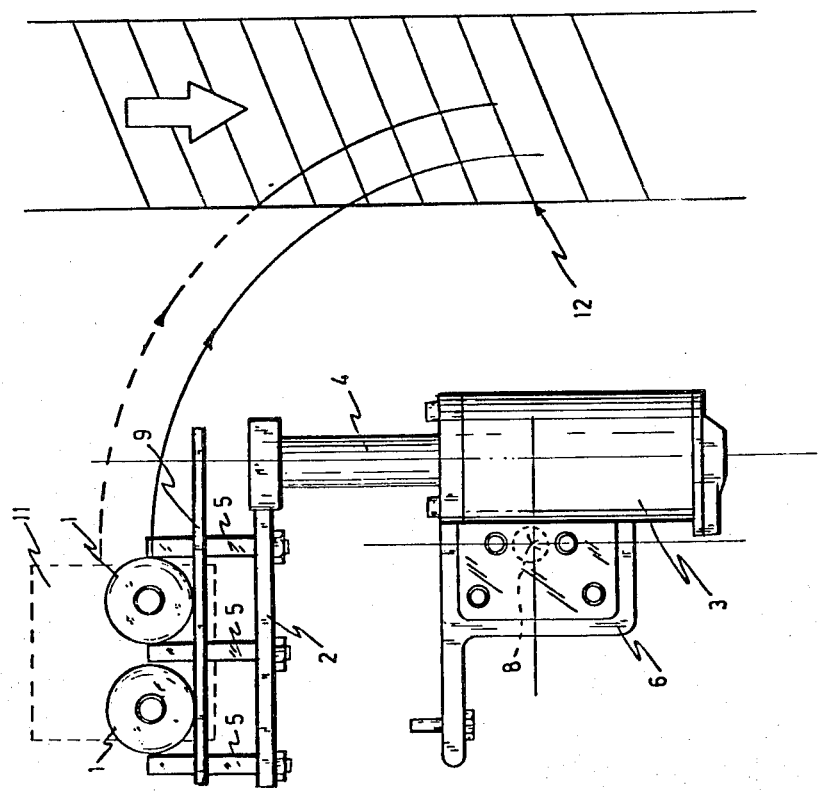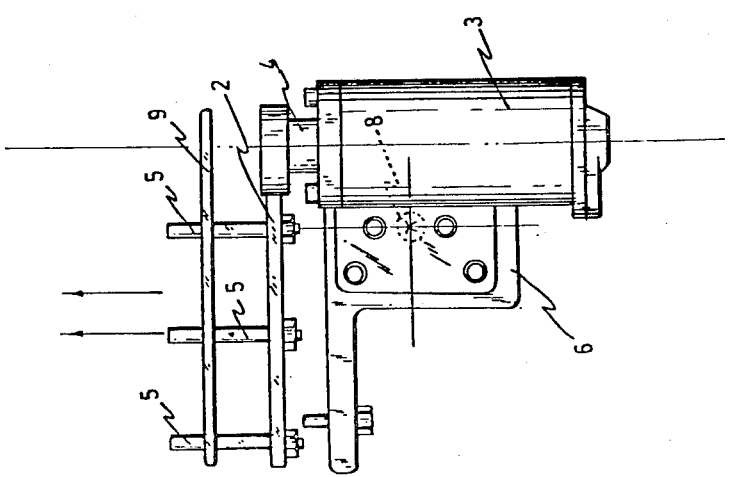

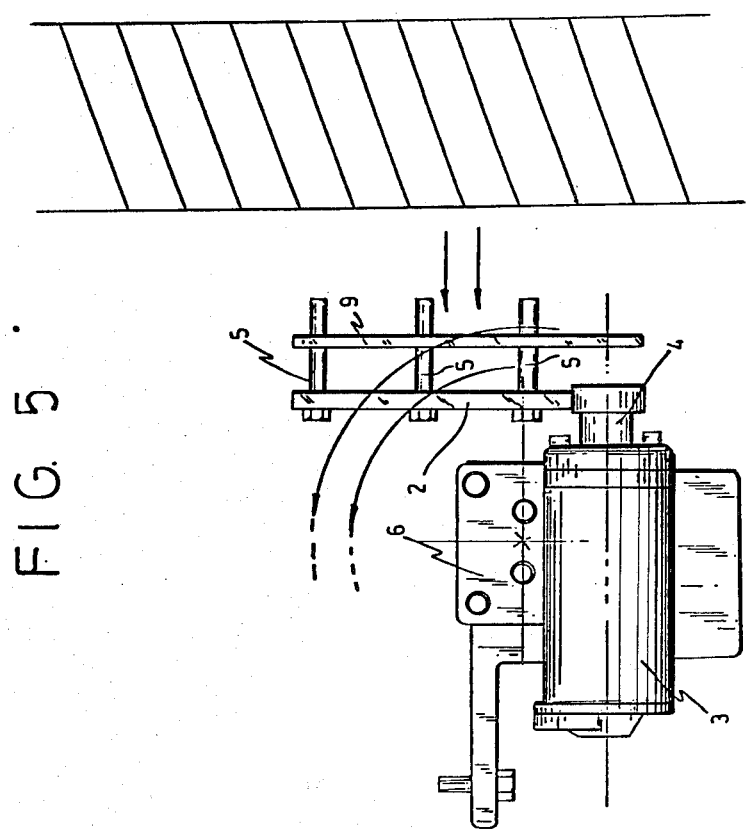
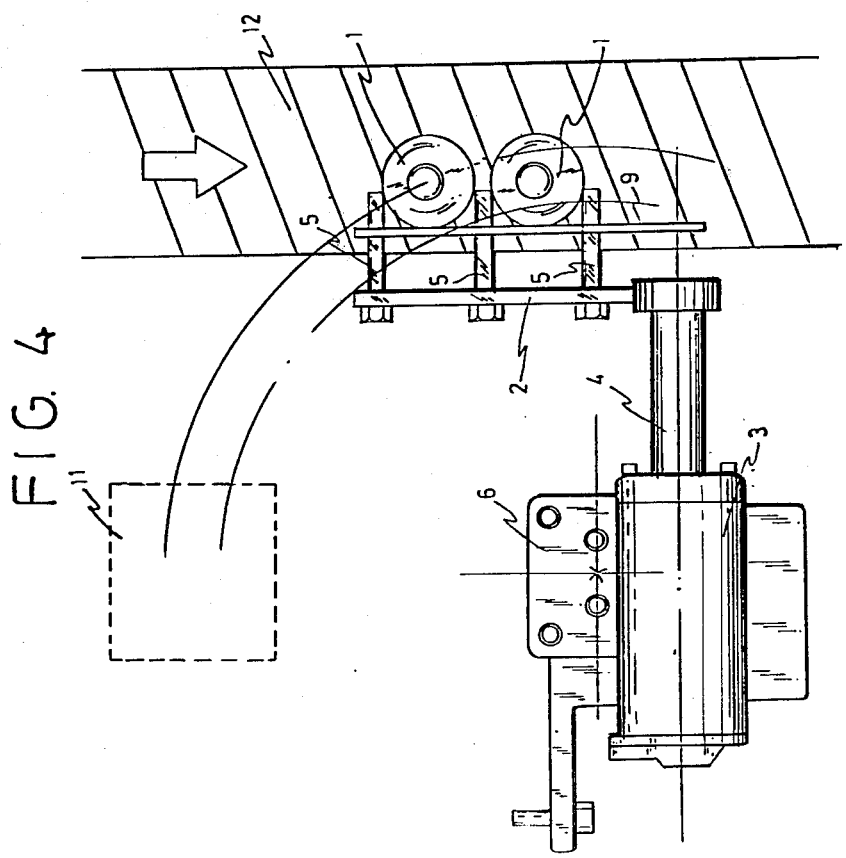

90 DEGREE PUSH-OUT FOR GLASSWARE FORMING MACHINES AND ELECTRONIC CONTROL FOR THE SAME

FIELD OF THE INVENTION

The present invention relates to an electronic 90° push-out for glassware forming machines, which functions to move one or more pieces of glassware such as newly formed bottles from the dead plate to the unloading conveyor, and to an electronic control for the same, which avoids the use of any kind of cams and mechanical parts susceptible to wear.

BACKGROUND OF THE INVENTION

The 90° push out apparatuses used normally in glassware forming machines, particularly of the I.S. type, are well known in this art and usually comprise a horizontal hydraulic cylinder and piston assembly supported on a vertical rotary shaft. The piston rod of such assembly is provided with a plurality of article push-fingers and is moved inwardly and outwardly to extend the fingers to the dead plate located at the unloading station of the glassware forming machine. In this way the articles deposited on the dead arc trapped and then, by means of an adequated cam, the whole rotates to push out the glass articles from the dead plate and deposit them, at a predetermined velocity onto the unloading conveyor of the machine.

The velocity and movement control of this type of 90° push-out for glassware forming machines, is determined exclusively by the design of the cam and its follower which rotate in synchronism with the velocity of the conveyor onto which the articles are received, in such way that the glass articles are pushed from the dead plate of the machine and deposited over the conveyor, at a velocity nearly equal-to the velocity of the conveyor, in order to avoid the falling and consequently breakage of the articles.

Even when such control mechanisms are functioning in a more or less efficient manner, it has not been possible to avoid a rather high percentage of breakage of the ware. This is because the cam profile is unalterable and operates with a cylinder type follower which is also unalterable. As a practical matter it is impossible to profile a cam exactly to the movement equation required for properly handling the various glass articles capable of being formed in a machine of this type. For example, in the case of round glass articles of large diameter, the unloading velocity may be deficient, because articles of relatively large width and low height are capable of traveling at considerable velocities and high accelerations compared to articles which are of greater relatively height and smaller diameter. Differently proportioned ware requires different cam and follower profiles and changing these items becomes expensive and time consuming.

The problem is even more critical when the ware is oval rather than cylindrical. Also, the thickness of the ware is of considerable importance, and the only way of handling such ware with the push out mechanism of prior art, is to deccelerate the machine motion and decrease production, since production at the same velocity of those which are more stable, would make the percentage of breakage absolutely unecomonical.

The movement control mechanisms for the 90° push-out apparatus in the glassware forming machines of the prior art, therefore leaves much to be desired as to versatility, because they don't allow programming the production of the machine for different types of ware. It is necessary therefore using the prior art machines to engage in relatively long production of each type of ware.

The control cams of the prior art push-out apparatus, inherently are not versatile mechanisms and can be considered as designed for a single type of ware.

Consequently the long standing problem has prompted such variations as pantographic mechanisms to decrease or increase the accelerations caused by the push-out mechanism on the stationary ware until the present invention no really satisfactory improvement has been developed.

BRIEF SUMMARY OF THE INVENTION

Having in mind the defects of the control mechanisms of the prior art, it is an object of the present invention to provide a 90° push-out for glassware forming machines together with an electronic control both of, which are of a very simple construction and yield a substantially higher efficiency. articles outwards of the dead plates of the forming machine.

Another object of the present invention is to provide a 90° push-out and an electronic control which permits changes in the fabrication program for diverse glass articles in the same machine, without the necessity of long stops for the replacement of the mechanical elements.

A more particular object of the present invention is to provide a 90° push-out for glassware forming machines, which avoids the use of fixed profile cams and uses instead diverse means to fulfill the movement equation for the several glass articles that are push-out by various shapes of ware.

It is another object of the present invention to provide an electronic control for the above 90° push-out for glassware forming machines, that by means of the simple change of feeding data to its floating memory, change the movement equation for the ware, to adapt the machine to the production of very different shapes of ware at no sacrifice in production rate.

An additional object of the present invention is to provide an electronic control for 90° push-out, that is capable of compensating automatically for velocity variations of the unloading conveyor.

These as well as other objects and related advantages, are achieved by substitution for the traditional cams of the prior art, a step motor operated by electronic control signals which impart movement according to the number of pulses per unit of time which are fed to the motor. In this way it is possible to vary the velocity and adapt it to a predetermined equation that is pre-programmed in the fixed memory of the data processing unit which operates said motor. This permits variation of all its parameters, by means of the simple change of information fed to the floating memory of said data processing unit, so as to adapt to a wide range of sizes and configurations of ware fingers of the 90° push-out, is operated by a solenoid controlled pneumatic valve whose solenoids are also operated by means of signals received from the data processing unit circuit. This ensures that that the piston comes out and the fingers trap the ware into a position it over the unloading coveyor, at the precise moment to, match the velocity of the ware with the velocity of the conveyor, irrespective of the variations of the conveyor velocity to minimize ware breakage.

BRIEF DESCRIPTION OF THE DRAWINGS

FIG. 1 is a partially schematic elevational view of the 90° push-out according to the present invention.

FIG. 2 is a plan view of the 90° push-out showing it in a first rest position and with the article trapping fingers aligned directly with the dead plate which receives the finished ware from the forming machine.

FIG. 3, is a plan view similar to FIG. 2 but showing the articles trapping fingers trapping two glass articles placed on the dead plate.

FIG. 4, is a view similar to FIG. 3, showing the push out rotated 90° in respect to the position of FIG. 3 by means of the step motor to deposit finished ware over the unloading conveyor of the machine.

FIG. 5, is a view similar to FIG. 4, but showing the piston retracted to release the ware deposited on the conveyor.

DETAILED DESCRIPTION

Figure 6:
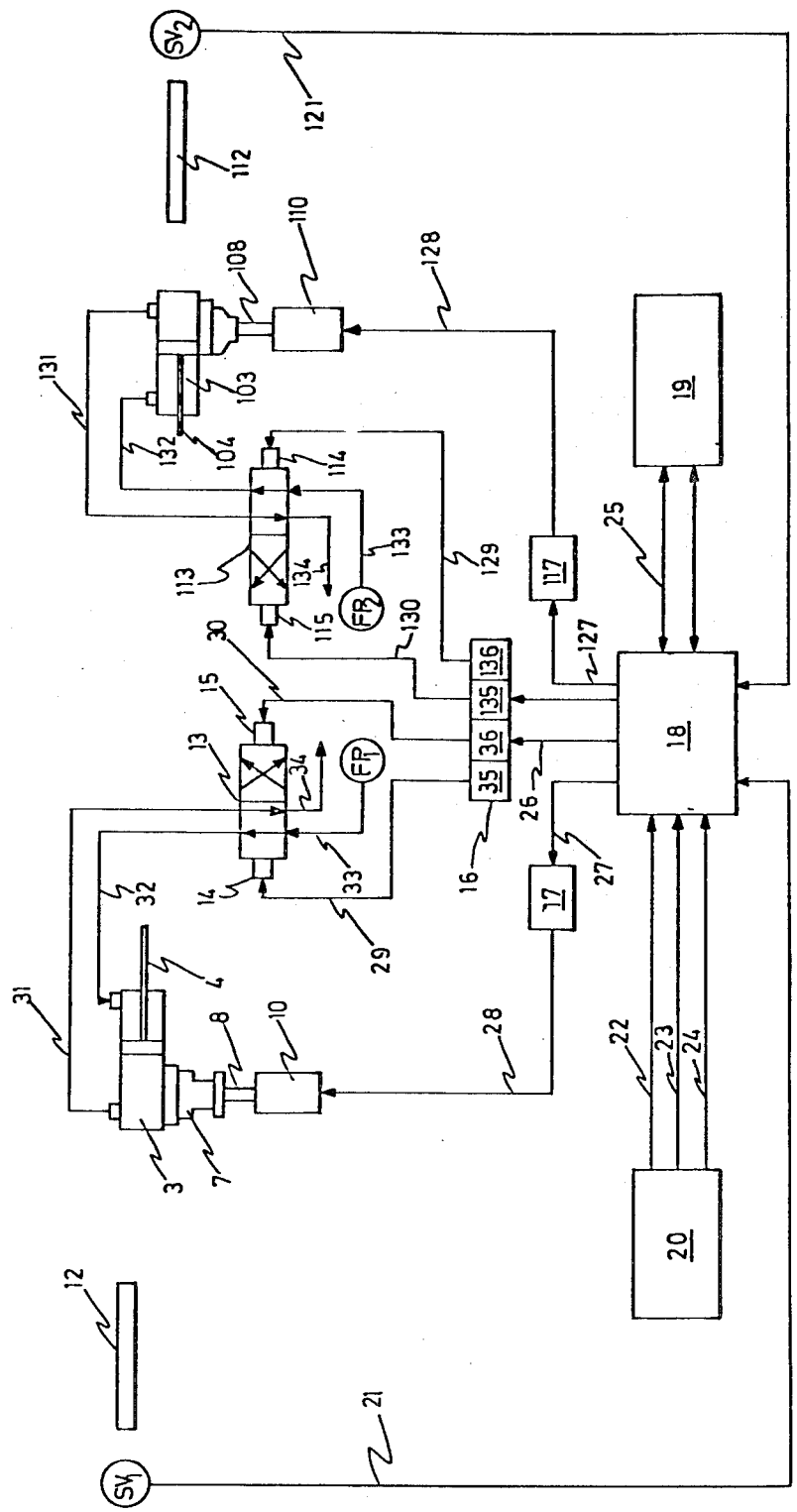
FIG. 6 is a schematic block diagram of the essential parts of the electronic control of the present invention applied to two machine sections.

In order to understand fully the nature of the electronic control of the present invention, it is useful to describe first the mechanical parts of the glassware 90° push-out more particularly with relation to FIGS. 1 to 5 of the drawings. These particularly to FIG. 1 show a glass article 90° push-out particularly adapted to be used with a glass ware forming machine of the I.S. type, and which comprises esentially a cylinder and piston assembly generally indicated at 3, and having a piston rod 4 movable outwardly and inwardly of the cylinder 3. Supported on piston rod 4 is a plate 2 which causes a plurality of fingers 5, capable of trapping the ware 1 resting on the dead plate 11 of the glassware forming machine. As best seen in the plan view of FIG. 2 of the drawings, the finger assembly has a plurality of fingers depending 5 on the number of articles to be simultaneously trapped and pushed. As shown there are three fingers to trap two articles simultaneously which are on the dead plate 11. This is shown most clearly in FIG. 3 of the drawings. Fingers 5 are mounted transversely on support plate 2, and in an intermediate position of the fingers a back plate 9 is positioned on the fingers parallel to the plate 2 in order to support the glass articles 1. The back plate 9 is adjustable along the fingers 5.

The cylinder and piston assembly 3 is mounted over a base plate 6 having a sleeve 7 which surrounds a rotatory shaft 8. The shaft 8 is coupled directly to a step motor 10, for rotation.

The extractor mechanism built according to the present invention operates in association with dead plate 11 and unloading conveyor 12 of the glassware forming machine. As may be clearly seen in sequence of operation illustrated in FIGS. 2, 3, 4 and 5. From the start position of FIG. 2 the cylinder 3 receives a signal to push the piston rod 4 outwardly to cause the fingers 5 to trap the articles 1 previously deposited on the dead plate, after a rest time on said dead plate, determine by the type, weight, and geometry of the article. From push-out in the position illustrated in FIG. 3 of the drawings, the step motor 10 receives pulse signals from the control circuit to rotate the pusher mechanism in the clockwise direction to unload the articles 1 from the dead plate, rotate them through an arc of approximately 90° and deposit them over the conveyor 12 with a velocity practically equal to the velocity of said conveyor. Afterwards, when the articles are over the conveyor as shown in FIG. 4 of the drawings, it the cylinder retracts fingers 5 to release the glass articles the conveyor.

Figure 7:
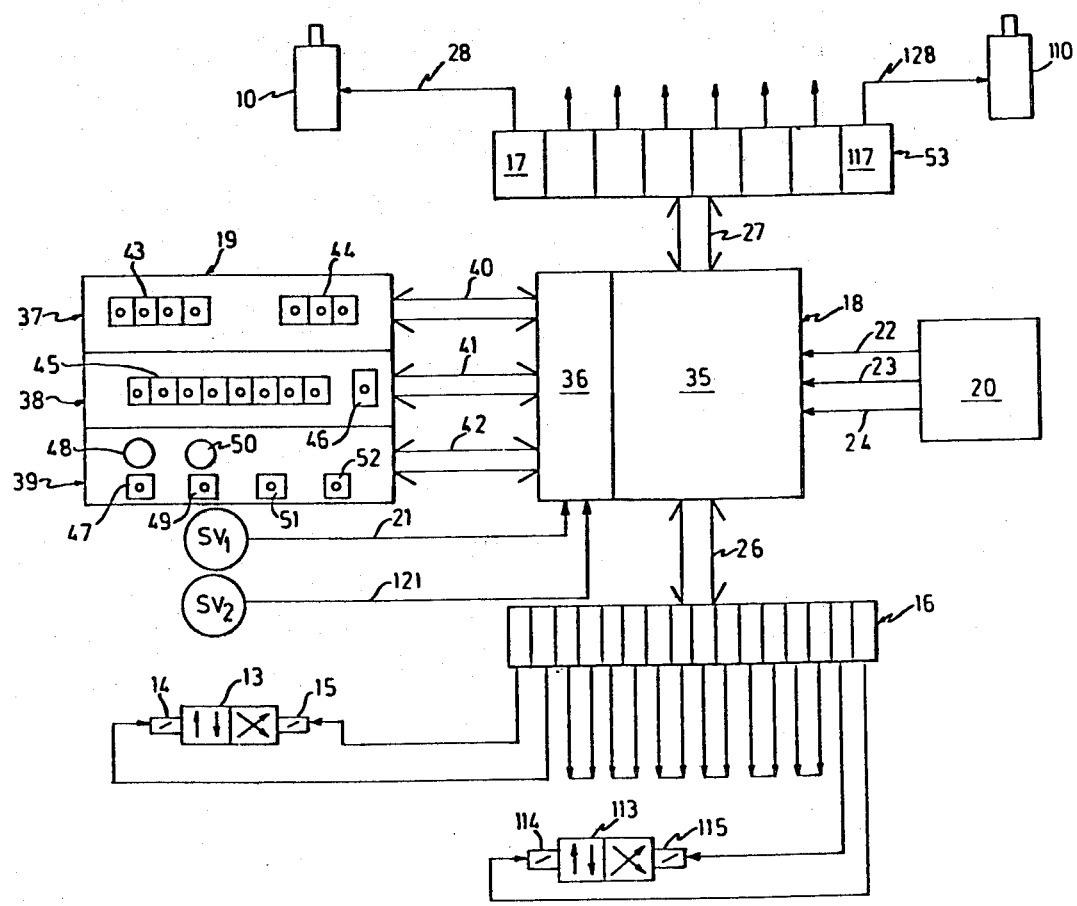
FIG. 7 is a block diagram of the electronic control and operator panel according to the present invention.

In order to effect the movements above described, an electronic control system, is provided, a preferred embodiment of which is illustrated in the block diagrams of FIGS. 6 and 7.

The electronic control as illustrated in FIG. 6 of the drawings, must be capable - of controlling the operation of the glass articles push-out associated with each one of a plurality of machine sections. As is well known, a machine particularly of the I.S. type, generally comprises 6, 8 or more sections which are all controlled by a central control 20, whether electronic or mechanical timing drums are employed. The electronic conrol of the present invention as illustrated in FIG. 6 of the drawings will be described, in relation to the control of a two section machine, because the circuits for each section are the same.

The electronic control of the present invention comprises a data processing unit 18, which is connected to the central control unit 20 of the machine which controls all the mechanisms of the same, and that as previously mentioned, can be an electronic control as the one described, illustrated and claimed in the U.S. Pat. No. 4,108,623 of Cardenas-Franco, issued on Aug. 22, 1978 or a mechanical timing drum of a known type. In either event, the unit 20 sends signals to the data processing unit 18, by means of lines 22, 23 and 24 such as a signal for the starting of cycle.

The data processing unit 18 is interrelated with an operator panel 19 which interchange logic signals 25 and with said data processing unit 18, as will be described hereinafter with more detail.

By means of signals received from the central control 20 through lines 22, 23 and 24, in cooperation with the logic signals derived from the operator panel 19 through the line of logic signals 25, the data processing unit 18 of the control according with the present invention, sends electric signals duly coordinated and in times duly selected, both to the step motors in each section of the machine, and to the pneumatic valves 13 and 113, to operate in proper sequence, both the shaft 8 which rotates the push out and the fingers 5 which trap the articles on dead plate 11 and release them to the conveyor 12.

It will be understood each machine section of a plural machine is controlled by a circuit which is the same as the one illustrated for a two section machine in the FIG. 6. The data processing unit 18 sends an electric signal through line 27 to the signal amplifier 17, which in turn sends an amplified signal to a step motor through line 28 in order to operate it at a velocity, acceleration and period of time previously programmed in the processing unit 18.

The data processing unit 18 also controls the piston rod 4 and fingers 5. For example, a signal on line 26 to a block of solid state relays 35, 36 is effective control through line 29, solenoid 14 of valve 13 or through line 30, solenoid 15 of said valve.

In the position indicated in FIG. 6 the pressure fluid source $FP_1$ is sending pressure fluid through line 33 to pass directly through pneumatic valve 13 and from there by the line 32 into the cylinder 3, to retract the piston rod. The fluid coming out through line 31 of cylinder 3, passes again through valve 13 and out to an exhaust through line 34. When opposite solenoid i.e., the solenoid 15 is energized, by means of a signal fed by the solid state relay 36 through line 30, then the valve would change the position and to invert the fluid flow, since the fluid of the pressure source FP₁ would pass through line 33 to line 31, from there to cylinder 3 through line 32, again to valve and from there to exhaust 34, causing extension of the piston rod 4 and fingers 5.

By means of adequated programming two movements can be effected, i.e. the rotation and the advance, and the retraction of fingers 5, in the proper sequence to achieve the illustrated movements previously described with reference to FIGS. 2 to 5. The operator panel 19 is capable of modifying the control signals as it will be apparent from the following.

FIG. 7 of the drawings, illustrates in more detail the operator panel 19 and the data processing unit 18. It is possible to see in this Figure that the operator panel 19 may comprise three different sections 37, 38 and 39. Section 37 has a plurality of digital switches 43 which are capable of feeding a number representative of the profile of the articles that are being pushed by means of the push-out apparatus of the present invention, and another group of digital switches 44, is capable of feeding a number representative of the dwell time of an article on the dead plate for cooling.

These signals, which are fed by an operator by action of the digital switches 43 or 44, pass to the interface card 36 through logic line 40, and from there are fed to the data processing section 35 of the unit 18, for the purpose of varying the parameters of the pusher movement according to the movement equation contained in the fixed memory of the data processing section 35.

The section 38 of the operator panel comprises either a plurality of switches 45 or a selector switch to select the machine section to be fed the data given by section 37, and a switch 46 which determines the start of all sections of the machine.

The third section 39 of the operator panel 19, comprises a plurality of position switches, including the start switch 47 with its luminous signal 48, the inhibition switch 49 with its corresponding luminous signal 50, the resetting switch 51 and the on and off swtich 52. All the signals from the selector switch of the 38 section of the operator panel 19, passes to the interface card 36 through the logic line 41 while all the position switch signals from section 39 of the operator panel 19, pass to said interface card 36 through logic line 42.

The speed of the conveyors 12, is sensed by means SV1 and SV2 shown in FIGS. 6 and 7. Referring to FIG. 7, the velocity it controlled by means of a signal calculated in 35 according to the cycle time and rotation radius. This signal is sent to the motor through line 21 from the interface card 36 of the data processing unit 18.

From the data processing section 35 of the unit 18 a signal 27 goes to a block 53 of a plurality of signal amplifiers 17, 117. Each signal amplifier sends electric signals through lines such as 28 and 128 to the step motors 10, 110 as previously described.

The data processing unit receives the described signals on lines 22, 23 and 24 of the central control unit of the machine 20, and finally through logic line 26, the data processing unit 18 sends signals to the block or group of solid state relays 16, which by pairs send the respective signals to the solenoids 14, 15 or 114, 115 of the pneumatic valves 13, 113.

The operation of the electronic control built according with the present invention is as follows:

First switch 52 is closed to activate the control circuit. Next the fixing switch 51 is closed to prepare the control to receive information selected by means of switches 45.

Next by operation of the group of digital switches 44, the resting time of the article on the dead plate, is selected, and afterwards by means of digital switch 43, the number corresponding to the velocity profile according to the shape factor for the article that is being processed is selected.

Then the start switch 47 is closed, turning on the luminous signal 48 which indicates that the control is ready to operate by means of the reception of the signals from the central control of the machine to begin the cycle.

Next the starting switch 46 of all the sections is closed, conditioning the control to operate the entire machine depending upon the central control 20 which will feed the starting signal of the cycle for each section of the machine at the proper time so that the control of the present invention operates the push-out apparatus in the proper sequence.

If it is desired to inhibit the functioning of the control then the inhibit switch 49 is closed, turning on the luminous signal 50 to indicate that the control is in an inhibit stage for the machine section in question. When it is desired to go back from an inhibit stage to a normal operation stage, it is necessary to again feed the information by means of the digital switches 43 and 44 and again actuate the starting button as previously described.

By means of digital switches 43 and 44 in the operator panel 19, an adequate program can be fed to the data processing unit 18, which offers a movement equation exactly as needed for the type of articles being handled. This allows the control of the present invention for fabricating a wide range of glass articles, without the necessity of long stops for the replacement of cams in the like.

While a preferred embodiment of the present invention has been herein shown and described, Applicants claim the benefit of a full range of equivalents within the scope of the appended claims.

I claim:

1. In an electronic control system for an article transfer apparatus for transferring glassware articles from a dead plate of a glassware forming machine to a take-off conveyor and comprising a fluid actuating cylinder and piston assembly mounted for rotation on a vertical shaft between a first position on the dead plate and a second position on the take-off conveyor, ware engaging members mounted on said piston, means for actuating said cylinder and piston assembly between a retracted and an extended position, a stepping motor for rotating said vertical shaft, and control means for sequentially operating said cylinder and piston actuating means and said stepping motor for first extending said ware engaging members to engage ware resting on said dead plate, rotate said extended ware engaging members to deposit the ware on said take-off conveyor with a velocity component and a direction component substantially equal to the velocity and direction of the conveyor, retracting the ware engaging members, and rotating the retracted ware engaging members back to their original position on the dead plate:

means for adjusting the speed of said take-off conveyor as a function of the number of glassware articles handled by the glassware forming machine and of the desired spacing between articles on said conveyor and a real time clock for controlling the movement of said ware engaging members and said take-off conveyor as a function of the time between glass gobs fed to the glassware forming machines and a glass gob cut sensor for producing a timing signal to be fed to said real time clock and means for calculating the velocity profiles of said ware engaging members and said take-off conveyor as a function of the operator-input information about the desired spacing of the glassware articles on said take-off conveyor.

2. An electronic control system as claimed in claim 1 wherein said means for calculating the velocity profiles comprises a prom memory which provides the equation of movement said ware engaging members and a memory for receiving the information from the operator panel to control said prom memory as a function of the desired spacing of said glassware articles on said take-off conveyor.

3. As electronic control system as claimed in claim 2 wherein said means for adjusting the speed of said take-off conveyor comprising a logic controlled by said means for calculating the velocity profiles of said ware engaging members.

4. An electronic control system as claimed in claim 3 wherein said glass gob cut sensor is placed at the outlet of the molten glass receptacle associated with said glassware forming machine.

* * * * *